(12) United States Patent
Watanabe (10) Patent No.: US 8,437,038 B2
(45) Date of Patent: May 7, 2013

(54) IMAGE FORMING APPARATUS AND METHOD OF CONTROLLING THE SAME

(75) Inventor: Taichi Watanabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 947 days.

(21) Appl. No.: 12/534,776

(22) Filed: Aug. 3, 2009

(65) Prior Publication Data
US 2010/0033740 A1    Feb. 11, 2010

(30) Foreign Application Priority Data

Aug. 5, 2008    (JP) .................................. 2008-201611

(51) Int. Cl.
*G06F 15/00*    (2006.01)
(52) U.S. Cl.
USPC ............ 358/1.9; 358/1.1; 358/3.27; 358/531; 358/537; 382/254; 382/284
(58) Field of Classification Search ............ 358/1.1, 358/1.9, 2.1, 2.99, 3.27, 531, 537, 538; 382/254, 382/284, 298, 299
See application file for complete search history.

(56) References Cited

U.S. PATENT DOCUMENTS

| | | | | |
|---|---|---|---|---|
| 7,697,164 B2* | 4/2010 | Matama | ........................ | 358/1.9 |
| 7,769,245 B2* | 8/2010 | Maeda et al. | ................. | 382/284 |
| 7,986,832 B2* | 7/2011 | Maeda et al. | ................. | 382/164 |
| 8,184,902 B2* | 5/2012 | Maeda et al. | ................. | 382/164 |
| 2005/0088698 A1* | 4/2005 | Matama | ........................ | 358/2.1 |
| 2006/0170968 A1 | 8/2006 | Maki | | |
| 2007/0076980 A1* | 4/2007 | Maeda et al. | ................. | 382/284 |
| 2007/0147704 A1* | 6/2007 | Hirai | .............................. | 382/294 |
| 2008/0018949 A1* | 1/2008 | Fukuda | ......................... | 358/450 |
| 2008/0165376 A1* | 7/2008 | Tomohiro et al. | .............. | 358/1.9 |
| 2010/0128312 A1* | 5/2010 | Maeda et al. | ................. | 358/1.18 |
| 2011/0242563 A1* | 10/2011 | Maeda et al. | ................. | 358/1.9 |

FOREIGN PATENT DOCUMENTS

| | | |
|---|---|---|
| JP | 05-216969 A | 8/1993 |
| JP | 06-011935 A | 1/1994 |
| JP | 2003-80789 A | 3/2003 |
| JP | 2004-220038 A | 8/2004 |
| JP | 2004-276412 A | 10/2004 |
| JP | 2006-099629 A | 4/2006 |
| JP | 2006-352526 A | 12/2006 |

* cited by examiner

*Primary Examiner* — Kimberly A Williams
(74) *Attorney, Agent, or Firm* — Canon USA Inc IP Divison

(57) ABSTRACT

An image forming apparatus allows a print unit to print a sheet on which a user handwrites, and combines a handwritten image included in an image obtained by reading out a handwritten sheet with a background image, and prints the combined image. Further, a decor to determine decoration contents for the handwriting image and a painting pattern of a decorated area can be designated by the user, and the handwriting image is decorated according to the determined decoration contents and the painting pattern. Further, the decoration contents are determined according to the designated painting pattern as well as the designated decor. That is, the decor that the user desires may be adjusted to be suitable for the designated painting pattern and the decoration contents may be determined.

15 Claims, 12 Drawing Sheets

73
<THICKNESS OF RIMMING> ABOUT ⎕1⎕.⎕5⎕ mm

1100 DESIGNATION FIELD

| DECOR | | | | |
|---|---|---|---|---|
| [RIMMING] | YES ⬭ | NO ⬭ | | |
| | [THICKNESS OF RIMMING] | THICK ⬭ | THIN ⬭ | |
| [REVERSING] | YES ⬭ | NO ⬭ | | |
| [FILLING] | YES ⬭ | NO ⬭ | | |
| [SHADING] | YES ⬭ | NO ⬭ | | |

FIG.12A

1210 HANDWRITING SHEET

FIG.12B

1220 CHOICE OF SAMPLE

| | 1222 | | | | |
|---|---|---|---|---|---|
| 1221 | ● | ▦ | ▦ | ● | ⚡ | ... |
| RIMMING | YES | NO | YES | YES | NO |
| THICKNESS OF RIMMING | 0.3mm | N/A | 0.8mm | ... | |
| REVERSING | NO | YES | | | |
| FILLING | NO | YES | | | |
| ⋮ | | | | | |

IMAGE FORMING APPARATUS AND METHOD OF CONTROLLING THE SAME

BACKGROUND OF THE INVENTION

1. Field of the Invention

The present invention relates to an image forming apparatus including an image reading device, such as a scanner, and a print device, such as a printer, and a function of reading a digital image stored in a storage medium. In particular, the present invention relates to an image forming apparatus that can combine a digital image and a handwriting image of a user.

2. Description of the Related Art

For example, as discussed in Japanese Patent Application Laid-Open No. 2003-80789, a technique for combining a digital image stored in a storage medium and a handwriting image read by a scanner and printing the combined image has been known as one of functions of an image forming apparatus.

Further, as discussed in US Patent Application No. 2006/0170968, a function of performing a decoration such as white rimming or color-added rimming and filling on handwriting images and combining the handwriting images with the digital images, not combining the handwriting images as they are, has been known.

As a method that makes these decorations further splendid, increasing types of painting patterns applied to an area such as riming, filling, and shading may be come up with. In this case, a variety of splendid combination results can be expected by decorating with a plain color such as red and blue in addition to white or black, or a colored pattern such as checks or polka dot patters.

However, when the painting pattern is diversified, some problems occur. For example, in the case of the rimming, since the good-looking thickness is different depending on the painting pattern, rimming of the same thickness, regardless of the painting pattern, is not preferable.

Figure 1:
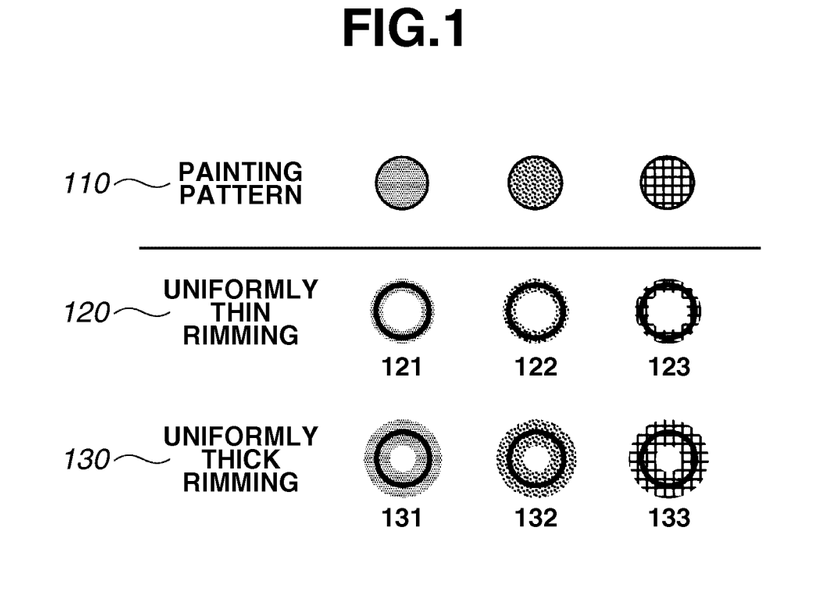
FIG. 1 illustrates the case in which rimming is performed with the same thickness regardless of a painting pattern.

FIG. 1 illustrates the case in which rimming is performed with the same thickness regardless of a painting pattern.

Like uniform thin rimming 120 illustrated in FIG. 1, if rimming is performed, it is appropriate as rimming for rimming 121 made by a plain color. However, in rimming made by a pattern like rimming 122 and 123, since a rimming area is small, a pattern is indistinct and thus unappealing.

In contrast, if uniform thick rimming is performed, like the rimming 132 and 133 (i.e., examples of the uniform thick rimming 130), the method is appropriate because the pattern looks clear. However, like the rimming 131, it looks thick for rimming made by a plain color.

As a method to resolve the above problem, in general, detailed setting items need to be prepared, for example, the setting that can designate the thickness of the rimming in detail.

However, when a user designates a decoration on a handwriting sheet, it is not possible to confirm a decoration application result. For this reason, the user cannot know the proper setting value and thus cannot determine the decoration. In particular, when the user cannot receive a feedback related to appearance until a final print product is output, ink or paper may be wasted.

In addition, for a user who is satisfied if the user can designate a rough decoration and the resulting decoration looks fine, setting of detailed setting items is troublesome.

SUMMARY OF THE INVENTION

The present invention is directed to an image forming apparatus that can combine a background image and a handwriting image and print the combined image, which can perform a good-looking decoration without enforcing detailed designation on users, even when various painting patterns are to be set.

According to an aspect of the present invention, an image forming apparatus includes a print unit configured to print an image on a sheet, a reading unit configured to read a sheet, a first print control unit configured to allow the print unit to print a sheet for handwriting, an extraction unit configured to extract a handwritten image corresponding to handwriting contents included in a read image obtained by reading a handwritten sheet, an input unit configured to input an instruction to designate a decor for determining decoration contents to the handwritten image and a painting pattern of a decorated area, and a second print control unit configured to allow the print unit to print an image where a handwritten image, which is decorated according to the decoration contents determined according to an input to the input unit and the painting pattern designated by an input to the input unit, is combined with a background image, wherein the decoration contents are determined according to the designated contents for the decor based on the input to the input unit and the painting pattern designated by the input to the input unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the present invention will now be herein described in detail below with reference to the drawings. It is to be noted that the relative arrangement of the components, the numerical expressions, and numerical values set forth in these embodiments are not intended to limit the scope of the present invention.

Figure 3:
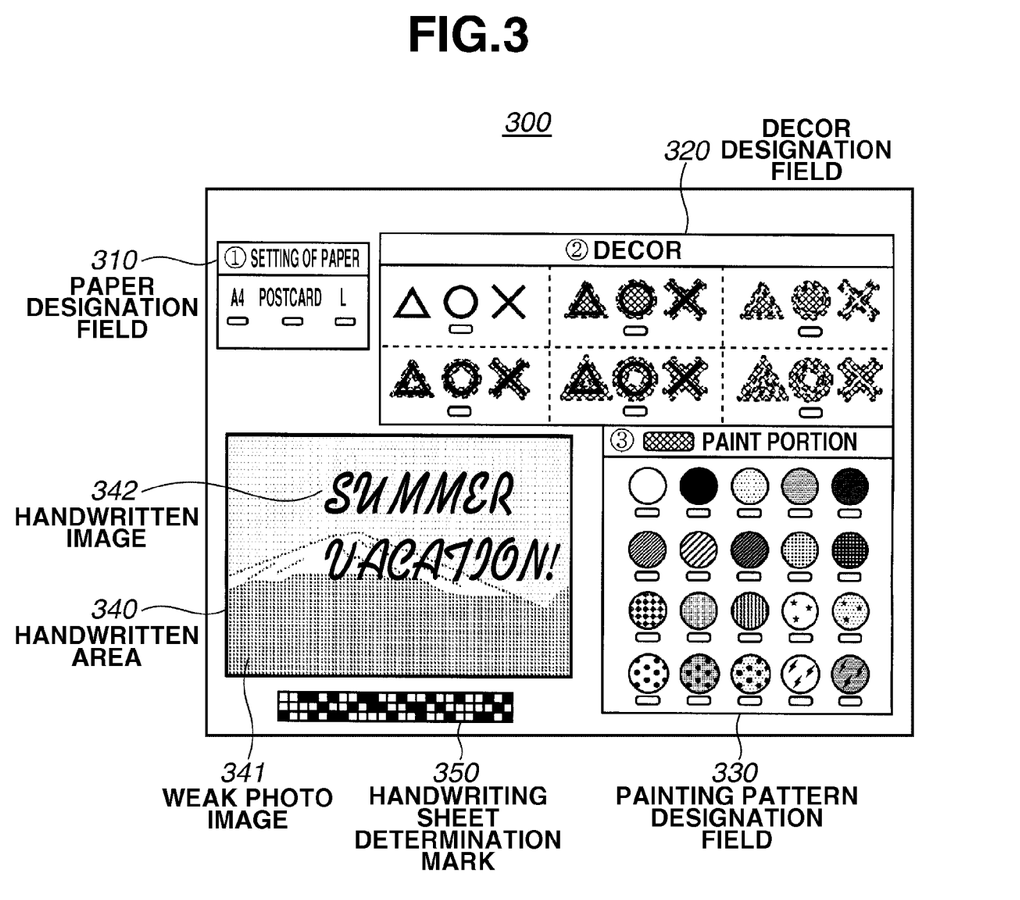
FIG. 3 illustrates an example of a handwriting sheet.

A function of allowing a user to combine a background image with handwriting characters or images that may be decorated if necessary and to print the combined image is called a "handwriting combine function" or simply called a "handwriting combine". FIG. 3 illustrates an example of a handwriting sheet 300.

Further, a plain color or a pattern that is applied to an area where a decoration, such as rimming, to a handwriting image is made is called a "painting pattern", which is designated by a painting pattern designation field 330 illustrated in FIG. 3.

Further, information that indicates contents of a decoration applied to a handwriting image is called a "decoration parameter". The decoration parameter is specific and quantitative information, and the decoration contents are determined according to the corresponding information. Examples of the decoration contents include existence or non-existence of various effects (rimming, wavy rimming, outlining, and shading) or sizes (thickness of rimming, intervals or heights of rimming waves, and thickness of shading).

In exemplary embodiments that are described below, a final decoration is determined by a painting pattern and a decoration parameter.

Further, information that represents a user intention about a decoration and is used as reference information to determine a decoration parameter is called a "decor". For example, in a decor designation field 320 illustrated in FIG. 3, the user can select a desired decor.

In the exemplary embodiments, a decoration is not directly made with a decor. It is made according to a decoration parameter that is determined based on a painting pattern and a decor selected by the user.

Accordingly, since the decor is finally converted into a decoration parameter that is specific and quantitative information, abstract information such as thick rimming or thin rimming may be usable in the decor.

Next, the handwriting combine function will be described. The handwriting combine function is divided into three stages, such as printing of a handwriting sheet, writing to the handwriting sheet, and analyzing of a document and printing of a combined image. In the description below, after describing the configuration of an image forming apparatus and the configuration of a handwriting sheet, three-stage processes of the handwriting combine are described.

Thereafter, kind of decoration, decoration parameter corresponding thereto, and decor are exemplified, and determination of a decoration parameter according to a painting pattern that features the present invention is described in detail.

Figure 2:
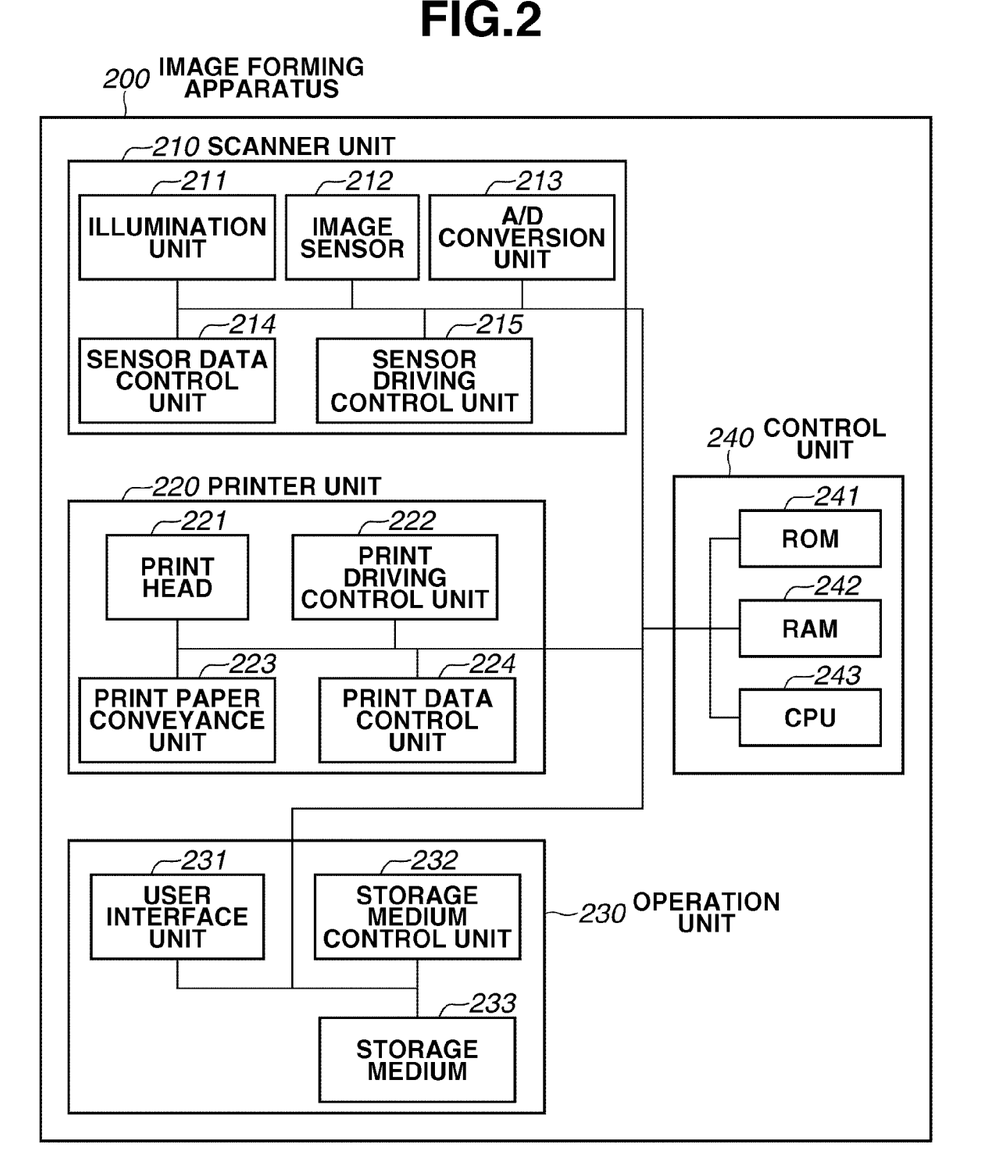
FIG. 2 is a block diagram illustrating an image forming apparatus according to an exemplary embodiment.

FIG. 2 is a block diagram illustrating an image forming apparatus 200 according to the present exemplary embodiment.

A scanner unit 210 is configured by a color scanner employing a contact image sensor (CIS) or a charge coupled device (CCD). The image forming apparatus 200 generates digital data of an image while driving in a direction the sensors disposed along a line.

An illumination unit 211 irradiates a document and reflected light is received by an image sensor 212, and an analogue-to-digital (A/D) conversion unit 213 converts the amount of received light into digital data. The obtained data is stored in a random access memory (RAM) 242 under control by a sensor data control unit 214. A sensor driving control unit 215 moves and controls the image sensor 212 and the illumination unit 211.

A printer unit 220 is configured, for example, by an inkjet printer. The inkjet printer applies ink, which is supplied from an inkjet cartridge (not illustrated), on printing paper, thereby forming an image. This operation is described below.

A print job is requested from external storage devices (not illustrated), such as a personal computer (PC), through an interface unit for the external devices (not illustrated). Print data for printing the image data, which is input from the external storage device, is temporarily stored in a print data control unit 224.

Further, if the user requests a copy job through a user interface unit 231, the scanner unit 210 reads it. The print data for printing the image data that has been sent via a control unit 240 is temporarily stored in the print data control unit 224.

A print driving control unit 222 determines a position of ink to be applied, based on the print data that is stored in the print data control unit 224. A printing paper conveyance unit 223 conveys the printing paper to the determined position, and drives a print head 221 that is a component to discharge ink. By this configuration, an image is formed on the printing paper.

A user can issue an instruction to the image forming apparatus 200 using an operation unit 230. The user interface unit 231 is an operation portion such as an operation panel including a key or a liquid crystal screen.

The storage medium control unit 232 connects a detachable storage medium 233, such as a memory card, to the image forming apparatus 200. If the connected storage medium 233 includes image data, the storage medium control unit 232 recognizes the image data and notifies the control unit 240 thereof.

The control unit 240 controls the image forming apparatus 200. A read only memory (ROM) 241 stores a control program for the image forming apparatus 200 (nonvolatile memory). The control program is executed by a central processing unit (CPU) 243, and thereby the control unit 240 functions as a scanner control unit and a printer control unit.

The control unit 240 functions as a handwriting sheet print unit, a handwriting sheet scanning unit, a combine execution unit, and a combined result print unit, in addition to the above units.

The scanner control unit controls the scanner unit 210 to create digital data of a document.

The printer control unit controls the printer unit 220 to form digital data on printing paper. If the user requests to create a handwriting sheet through the operation unit 230, the handwriting sheet print unit generates the digital data of the handwriting sheet using a photo image and the printer unit 220 performs an output control.

The handwriting sheet scanning unit acquires digital image data when the scanner unit 210 scans the handwriting sheet, and performs a control operation to extract a handwriting image from the digital image data. The combine execution unit combines the handwriting image and the photo image, and the combined result print unit transmits the combined result to the printer unit 220.

In the RAM 242, temporarily necessary data, such as image data read by the scanner unit 210 or data obtained when the printer unit 220 converts a file of a joint photographic experts groups (JPEG) format into print data to perform printing, is sequentially stored. When the data becomes unnecessary, the data is deleted from the RAM.

In the present exemplary embodiment, the handwriting sheet 300 is used as a mark sheet and the user may mark a sheet designation field. As a result, the user can designate a setting item. Here, on the assumption that the use marks the sheet designation field to designate a setting item, the following description is made.

The designation method for designating various items for a handwriting combine may be arbitrarily selected. For example, the designation may be made through a user interface on the image forming apparatus 200 or an external apparatus, such as a PC.

A paper designation field 310 is used by the user to select a paper size when printing is performed after the images are combined. However it is not limited to the information about the paper size illustrated in the paper designation field 310. An item that designates information about whether the paper to be used is normal paper or glossy paper may be included.

The decor designation field 320 is a field to be used when the user selects a decor for a desired handwriting image. The user selects whether or not to decorate the handwriting image, the thickness of rimming, whether or not to fill a closed curve, and whether or not to reverse a handwriting portion.

In the example illustrated in FIG. 3, whether or not to decorate the handwriting image with rimming, the thickness of rimming, whether or not to fill a closed curve, and whether or not to reverse the handwriting portion are visually illustrated using six samples to select.

The painting pattern designation field 330 is used for designating a painting pattern used for decoration. According to the selected painting pattern, decoration, such as rimming, filling, and shading, is made. Further, a pattern may be made with a plain color or a plurality of colors. For easy display, the painting pattern in the exemplary embodiments is formed with white and black. However, the colors of the painting pattern are not limited to white and black, and the painting pattern may have a various colors.

The handwriting area 340 is an area where the user performs handwriting, and is called a handwriting area in the exemplary embodiments. In the handwriting area 340, a weak photo image 341 where a photo image that is converted into a weak color is printed to allow the user to easily recognize positional relationship between the handwriting image and the photo image after they are combined.

A character of the handwriting image 342 is a character that the user additionally writes after printing of a sheet is completed. An arbitrary image may be drawn without being limited to the character. Further, the color in the drawings is black, but writing may be performed with an arbitrary color.

The handwriting sheet determination mark 350 is used to determine that a scanned document is the handwriting sheet 300 when it is scanned. Since information used to specify an image to be combined from among the images stored in the storage medium is included to the handwriting sheet determination mark 350, the contents of the handwriting sheet determination mark 350 are different to each sheet.

Next, the three-stage processes of the handwriting combine are described.

Figure 4:
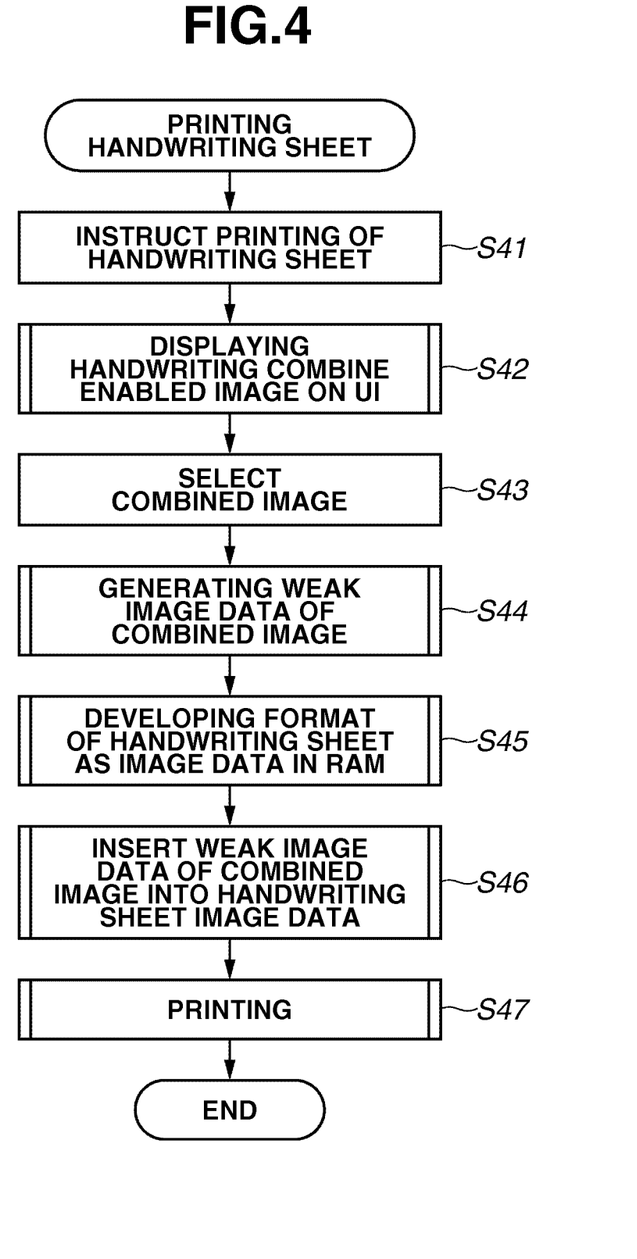
FIG. 4 is a flowchart illustrating an operation of printing a handwriting sheet.

FIG. 4 is a flowchart illustrating the operation of printing the handwriting sheet 300.

In description, "image data" is digital data where one unit is constructed in a format of having three values of R, G, and B for each pixel of an image.

In Step S41, a printing execution of the handwriting sheet 300 is instructed by the user's operation of the user interface unit 231. In Step S42, the CPU 243 generates in the RAM 242 a thumbnail image of the photo image that is stored in the storage medium 233, and displays the thumbnail image on the user interface unit 231.

In Step S43, a photo image to be combined is selected in response to the user's operation of the user interface unit 231.

In Step S44, the CPU 243 reads a photo image file from the storage medium 233 and temporarily stores the photo image file in the RAM 242. At this time, the CPU 243 generates the handwriting sheet determination mark 350 to show information indicating a used image from among the images stored in the storage medium 233.

Image data for printing a weak photo image in the handwriting area 340 of the handwriting sheet 300 is generated. First, upper and lower portions or left and right portions of the photo image are cut so that the same aspect ratio as that of the handwriting area 340 can be obtained. The cut image is resized so that the size of the cut image becomes the same size as that of the handwriting area 340 in a digital image format of the handwriting sheet 300.

Figure 5A:
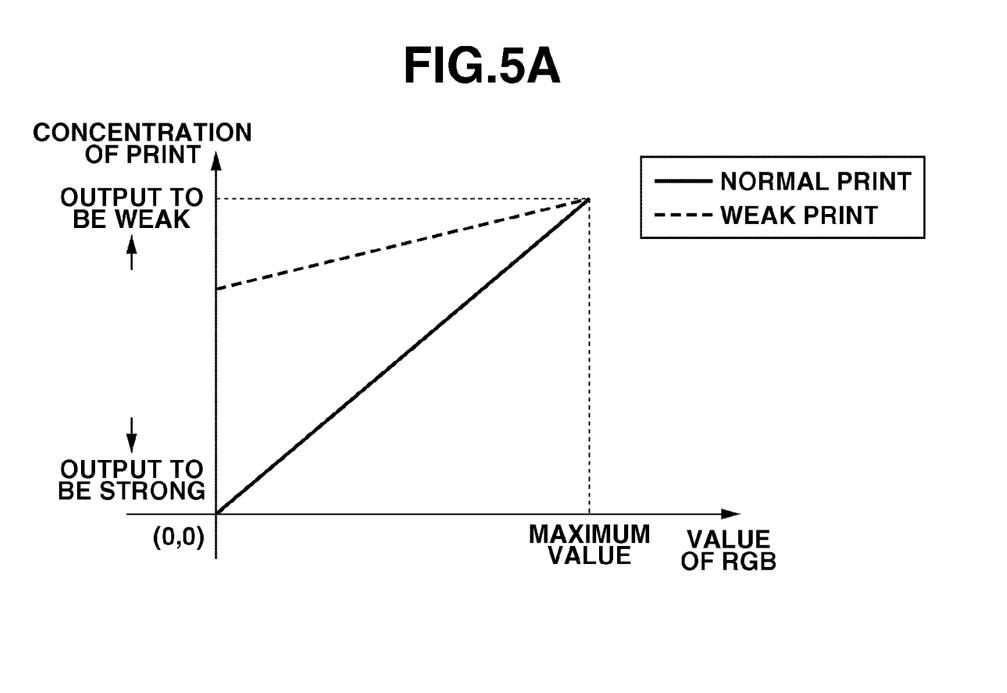
FIGS. 5A and 5B illustrate a weak photo image.
Figure 5B:
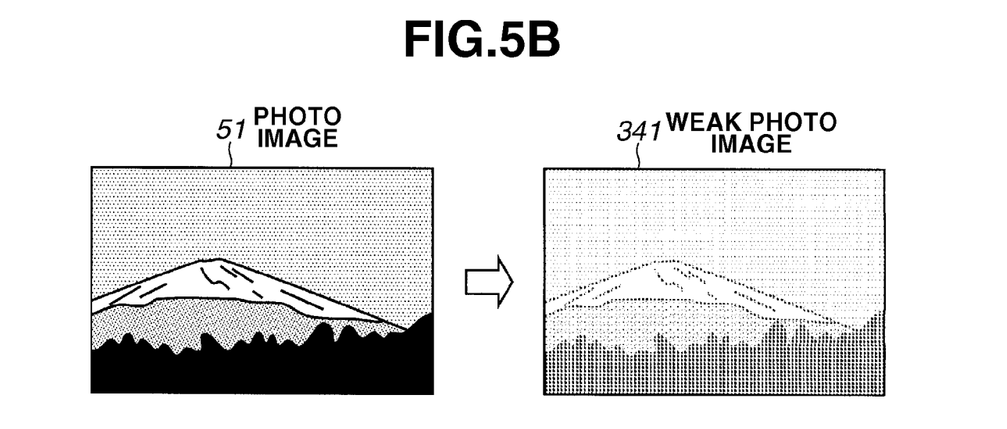

FIGS. 5A and 5B illustrate a weak photo image 341. As illustrated in FIGS. 5A and 5B, a photo image data is converted into image data of the weak photo image 341. The weak photo image 341 is obtained by reducing the number of gradations of the photo image 51 and representing the image using only a low concentration area.

At this time, even when the image has the same RGB value as illustrated in FIG. 5A, the image is weakly printed as compared with normal printing. The CPU 243 stores in the RAM 242 the image data of the weak photo image 341 generated by the above method and the image data of the handwriting sheet determination mark 350.

In Step S45, the CPU 243 stores a format of the digital image of the handwriting sheet 300, which is stored in the ROM 241, in the RAM 242.

In Step S46, the CPU 243 inserts the weak photo image 341 into the handwriting area 340 of the handwriting sheet 300, inserts the handwriting sheet determination mark 350 into a predetermined position, and creates print data of the handwriting sheet 300.

In Step S47, the CPU 243 outputs the created image data of the handwriting sheet 300 to the printer unit 220.

Next, the user writes each item in the handwriting sheet 300 that is printed according to the processing sequence illustrated in FIG. 4. Specifically, in the exemplified handwriting sheet 300, marking in the paper designation field 310, marking in the decor designation field 320, and marking in the painting pattern designation field 330 are made, and the handwriting image is drawn in the handwriting area 340.

Figure 6:
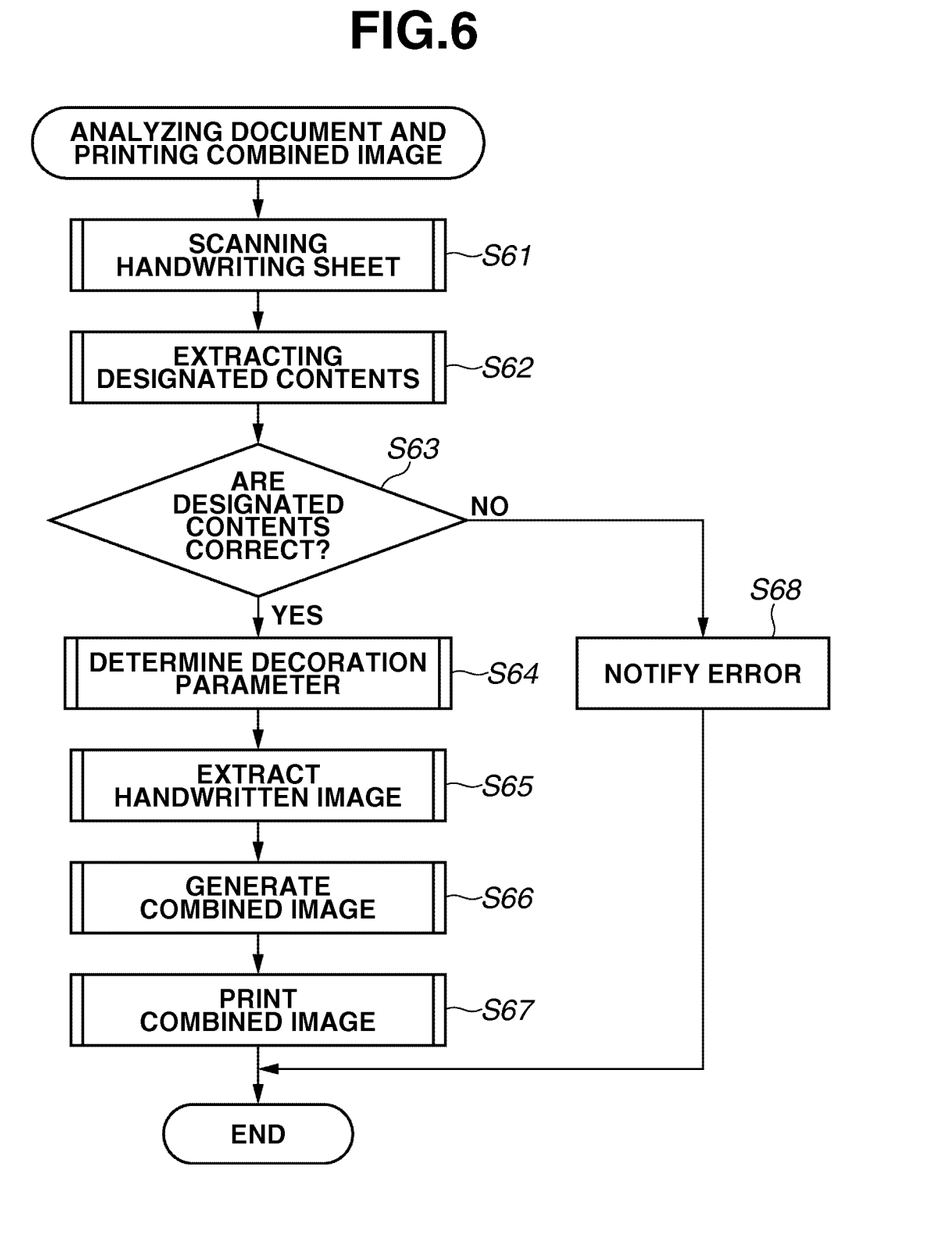
FIG. 6 is a flowchart illustrating a process from when the handwriting images are written in a handwriting sheet until when a print product, on which handwriting images are combined, is output.

FIG. 6 is a flowchart illustrating a process from when the handwriting images are written in the handwriting sheet 300 until when a print product with the handwriting images combined is output.

In Step S61, the CPU 243 displays for urging reading of the handwriting sheet 300 on the user interface unit 231. The user confirms the display and causes the scanner unit 210 to read the written handwriting sheet 300.

In Step S62, the CPU 243 inputs information indicating contents designated by the user, such as which field is selected from the paper designation field 310, the decor designation field 320, and the painting pattern designation field 330. In addition, the CPU 243 inputs information indicating which image is selected to combine with the photo image using the handwriting sheet determination mark 350.

In Step S63, the CPU 243 determines whether the information indicating the designation contents of the user extracted in Step S62 is correct for outputting a combined image. If the information is not suitable (NO in Step S63), for example, if there is no paper designation or no image designation, the CPU 243 notifies an error and ends the process (in Step S68).

In Step S64, the CPU 243 determines a decoration parameter based on the decor and the painting pattern determined to have been designated. The details thereof will be described below.

In Step S65, the CPU 243 extracts the handwriting image 342 that is drawn in the handwriting area 340, separated from the weak photo image 341.

In Step S66, the CPU 243 performs a decoration such as rimming and filling on the handwriting image extracted in Step S65 according to the decoration parameter determined in Step S64. The CPU 243 generates a combined image with the photo image 51.

In Step S67, the CPU 243 controls the printer unit 220 and prints the combined image generated in Step S66 in the sheet that is designated by the paper designation field 310.

Next, examples of types of decoration and corresponding decoration parameters are described. The types of the decoration or the decoration parameters in the invention is not limited to the examples.

In the exemplary embodiment described above, the decoration parameter for each decoration is individually described. However, like rimming and filling, a combination to be simultaneously applicable decorations may be used. The final decoration parameters include all decoration parameters of the applied decorations and existence or non-existence of application of each decoration.

Figure 10:
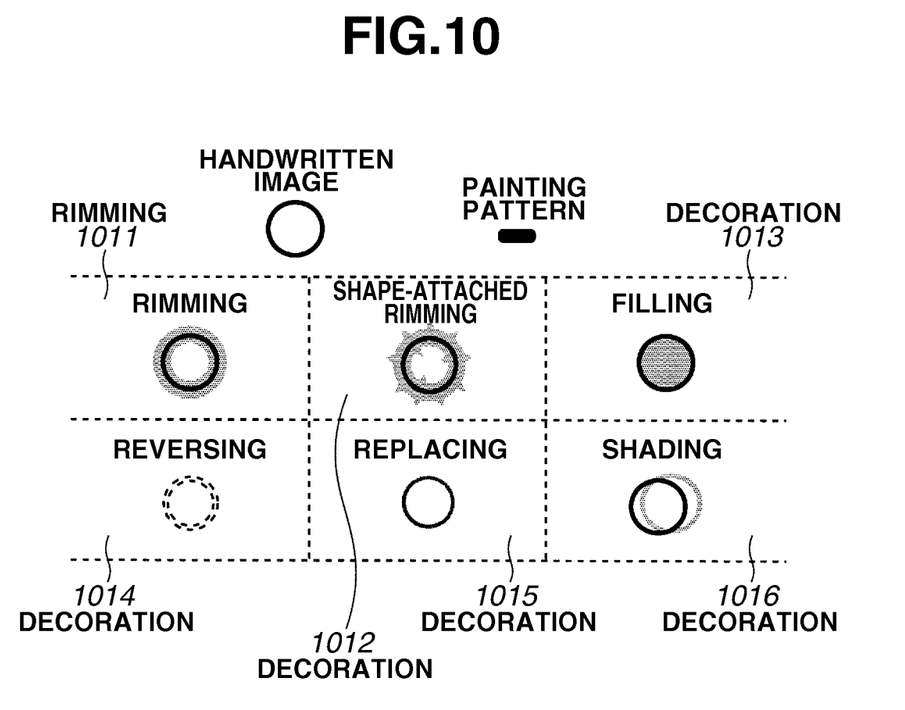
FIG. 10 illustrates examples of various decorations.

FIG. 10 illustrates examples of various decorations. Examples of the decorations include the decorations illustrated in FIG. 10. In the examples, decoration objects is a black circle and painting patterns are made in a plain color illustrated in FIG. 10.

The circumference of the handwriting image is decorated with a rimming 1011 of uniform thickness. The decoration parameter indicates existence or non-existence of the decoration and the thickness of the rimming. The decoration 1012 decorates the circumference of the handwriting image with rimming in a shape having protrusions. The decoration parameter indicates existence or non-existence of the decoration and the height and width of the protrusions.

As a decoration similar to the decoration described above, there is rimming that has a moderate wave shape. In this case, the height or width of the wave may be included as the decoration parameter. The decoration 1013 is a decoration "filling" that fills a closed curve of the handwriting image with a painting pattern. The decoration parameter indicates existence or non-existence of the effect.

The decoration 1014 is a decoration "reversing" that replaces a color of the handwriting image by a white color. The decoration parameter indicates existence or non-existence of the decoration, and is used together with the rimming or the decoration similar to the rimming.

The decoration 1015 replaces the handwriting image portion by painting with the painting pattern. The decoration parameter indicates existence or non-existence of the effect.

The decoration 1016 adds to the handwriting image a similar shadow thereof. The decoration parameter indicates existence or non-existence of the effect, a magnification of the size with respect to the handwriting image, which is information associated with the width of the painting, and a relative position (longitudinal and transverse) with respect to the handwriting image.

In the exemplary embodiment, since the final decoration parameter is determined by the image forming apparatus 200, information included in the decor designated by the user may be a portion of the information about the decoration and may be abstract information.

Accordingly, if the intention of the user can be reflected to some degree, items to be designated are desirably not detailed and complicated but simple to be easily recognized. Herein, instructions for designating the decor are input by reading and analyzing the handwriting sheet 300 where information is written by the user.

However, an instruction for designating the decor may be input through the user interface on the image forming apparatus 200 or an external apparatus, such as a PC.

Further, in the case where a plurality of fields to be designated for the decor designation exists due to a definition of the decor, if one field is designated and information about the decoration exists, the designation is regarded as "a decor designation exist", even though non-designated fields are left.

When the decor is designated, if there are three kinds of available decorations including rimming, filling, and reversing, a method for selecting from among visual samples is can be used, as illustrated in the decor designation field 320 of FIG. 3.

In this case, information about the rimming is limited to only abstract two stages such as thick and thin. If 6 choices are used, it can be easily recognized. In the decor designation field 320, a shaded area surrounded by a dotted line is an object that is painted with a painting pattern.

Figure 7A:
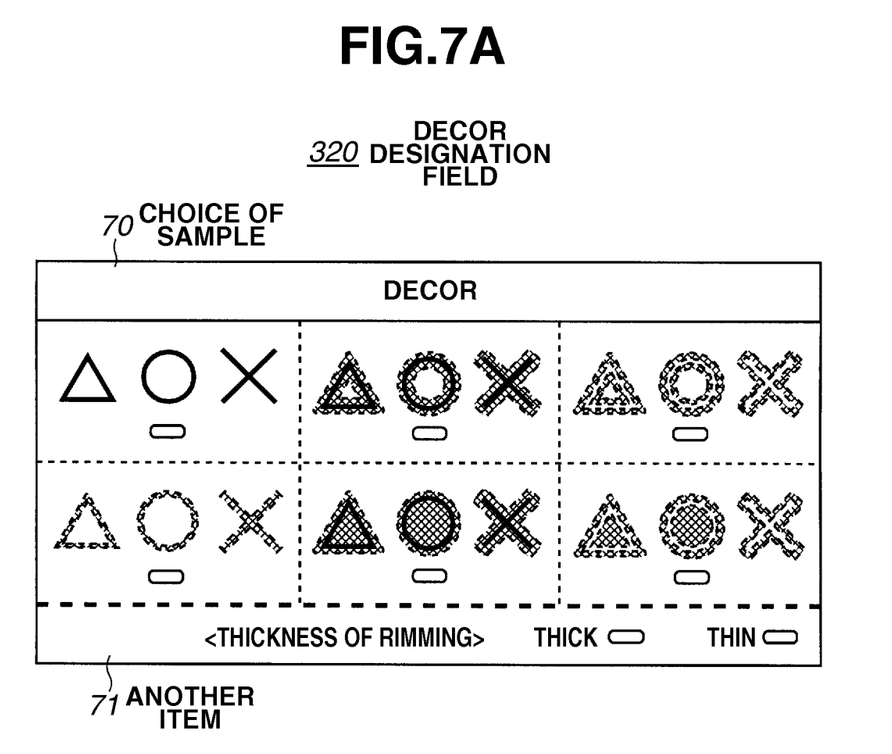
FIGS. 7A to 7C illustrate an example of a decor designation field.
Figure 7B:
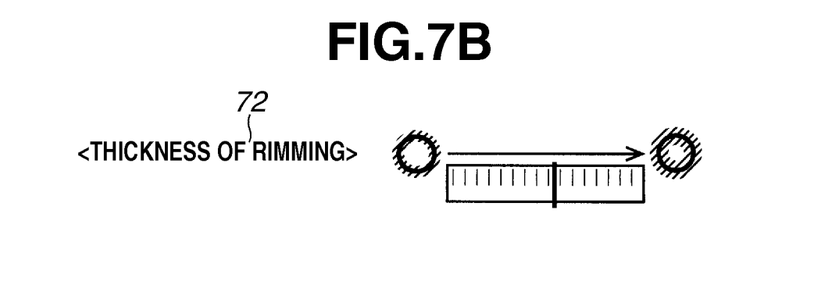
Figure 7C:
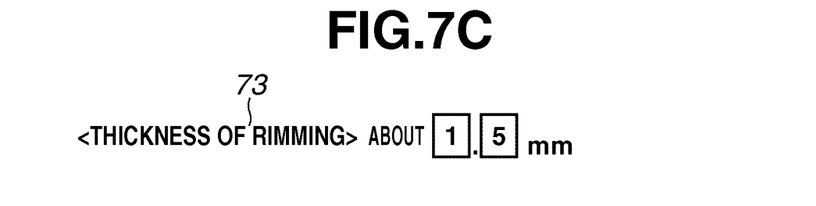

FIGS. 7A to 7C illustrate an example of a decor designation field. When the decor is designated, it is not limited to one choice from a plurality of choices.

As illustrated in the choice of the sample 70, a choice of a visual sample may be prepared just for selecting existence or non-existence of an application of various decorations. The user may designate the thickness using another item 71 different from the choice.

At this time, the designation of the thickness of the rimming is effective for only choices with rimming. Further, when the thickness of the rimming is designated, a method of drawing a line in a portion displayed by a gauge (it means that the thickness increases toward the right) to designate the thickness like the thickness 72 of the rimming or a method of directly writing a numerical value like the thickness 73 of the rimming may be used. All methods may be used as long as the intention of the user can be expressed.

Figure 11:
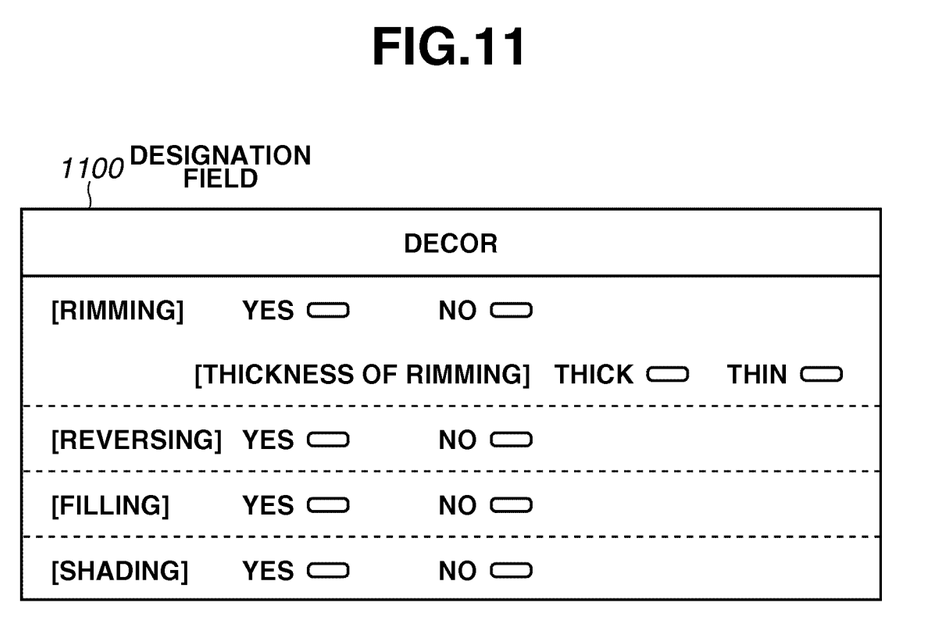
FIG. 11 illustrates an example of a decor designation field that does not use a visual sample.

FIG. 11 illustrates an example of a decor designation field that does not use a visual sample. With respect to existence or non-existence of an application of various decorations, a visual sample may not be used. As illustrated in FIG. 11, the designation field 1100 for an application of each decoration may be prepared.

The feature of the exemplary embodiment is that a parameter (i.e., decoration parameter) other than a painting pattern for a decoration is affected by the designation of the painting pattern. Herein, a method for determining a decor parameter is exemplified.

Similar to the case where the decor is designated, an instruction that designates the painting pattern is input by reading out and analyzing the handwriting sheet 300 written by the user. However, an instruction that designates the painting pattern may be input through the user interface on the image forming apparatus 200 or an external apparatus, such as a PC.

The most basic determination method is to set previously a decoration parameter for each combination of the decor and the painting pattern.

Figure 8A:
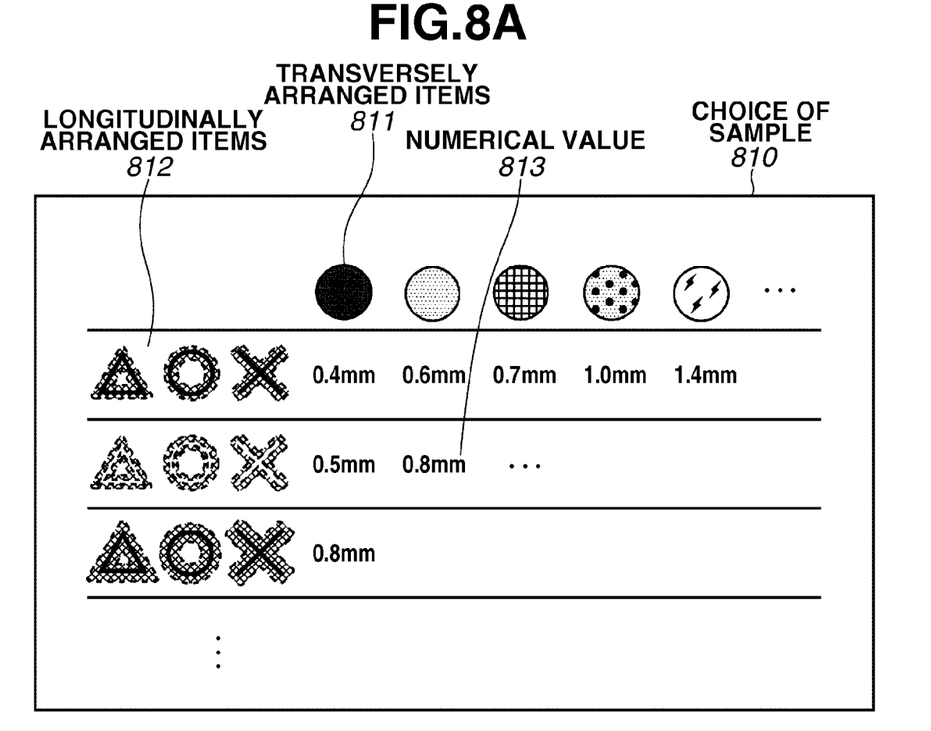
FIGS. 8A and 8B each illustrate an example of a determination rule of a rimming thickness.
Figure 8B:
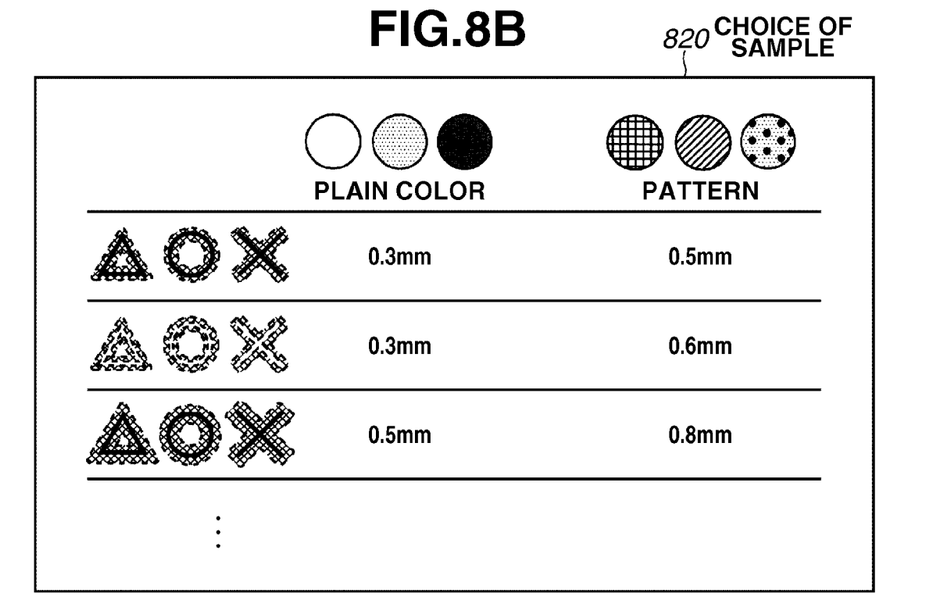

FIGS. 8A and 8B illustrate an example of a rule that determines the thickness of rimming. For example, when the decor designation field is like the decor designation field 320 illustrated in FIG. 3, as a setting value for the thickness of the rimming, the choice 810 of the sample may be used.

Transversely arranged items 811 show a painting pattern and longitudinally arranged items 812 show a decor. A numerical value 813 indicates the thickness of rimming for a combination of the decor and the painting pattern. The patterns are drawn under the following rules. That is, a pattern is drawn thicker than the thickness of the plain color. Among the plain colors, a weak color is drawn thicker. Among the patterns, if the repetition width is wider, the pattern is drawn thicker.

In this way, even if the designation of the decor is the same, the thickness of the rimming changed depending on the painting pattern is applied. As compared with the uniformly thin rimming 120 or the uniformly thick rimming 130 illustrated in FIG. 1, the decoration result of the good-looking rimming according to each painting pattern can be obtained.

Further, the thickness of the rimming may be differently set according to only whether the painting pattern is a plain color or a pattern, with respect to the rimming which has the same decor, like the choice 820 of the sample.

In addition to the thickness of the rimming, in regards to the decoration parameter for the size of the similar shadow or the decoration parameter for such as the height of the protrusion of the rimming, the similar setting may be applied.

Further, since existence or non-existence of each decoration is one of the decoration parameters, whether each decoration is executed or not may be differently set depending on the painting pattern. For example, in the designation of the decor, even though information indicating to perform reversing is included, setting may be made such that reversing is not performed in the painting pattern that is substantially white.

When this setting is used, regardless of the designation having been set with respect to existence or non-existence of various decorations, the designation may be ignored. Therefore, an item indicating that "a decoration should be performed according to the designation" may be prepared, for the convenience of the user.

Figure 12A:
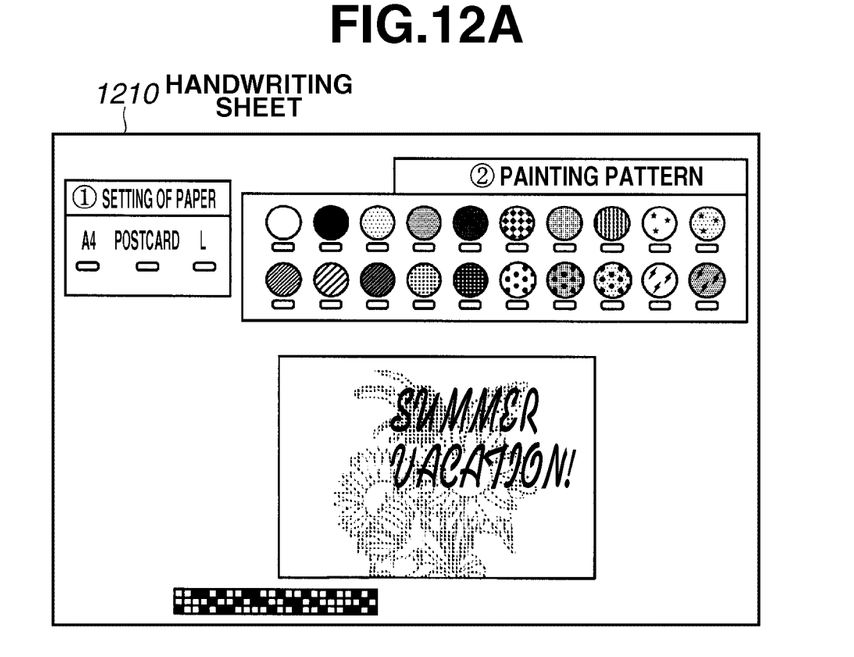
FIGS. 12A and 12B illustrate an example of a handwriting sheet with no decor designation field and a determination rule of a decoration parameter in this case.
Figure 12B:
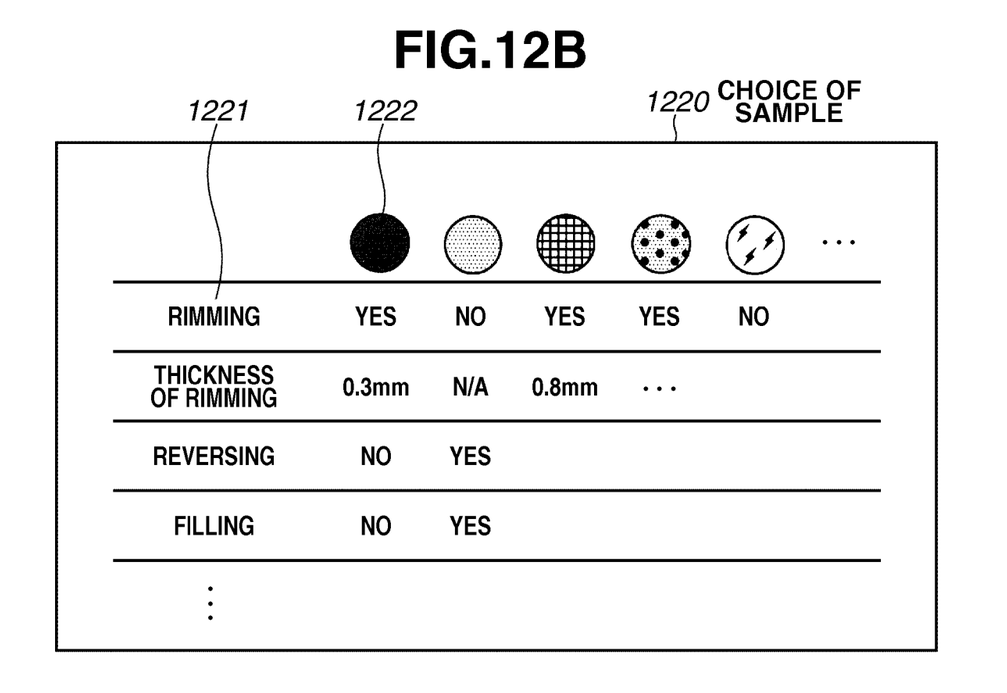

FIGS. 12A and 12B illustrate an example of a handwriting sheet where a decor designation field does not exist and a determination rule of a decoration parameter in this case.

Like the handwriting sheet 1210, a method may be used, in which the decor designation field does not exist, the user designates only the painting pattern, and a decoration according to the decoration parameter corresponding to the painting pattern is made. In this case, like the choice 1220 of the sample, a decoration parameter is previously set for each painting pattern, and a decoration may be made according to the setting value.

Further, even when the decor designation field exists, the designation of the user does not exist or an item like "automatic" exists in a designation field, and the designation thereof is made, a decoration parameter may be determined based on only the designation of the painting pattern, like the choice 1220 of the sample.

In the designation of the decor, even when the user designates a part of the items for decor, the decor may be regarded to be designated as described above, and the decoration parameter may be determined.

In short, a portion that is not designated in the decor designation field may be complemented. For example, in the choice 70 of the sample of the decor designation field 320, when only a visual sample indicating existence or non-existence of each decoration is designated, it may be regarded as that the "thin" is designated in another item 71.

In contrast, when only another item 71 is designated, it may be regarded as that the center of the upper stage (reversing does not exist in the rimming) is selected from the visual sample. The complementation method may be different for each painting pattern.

As another method, a method may be used, in which a determination rule, which assumes a decor designation field that is not designated to be not exist, is prepared for all "non-designated patterns".

For example, in the choice 70 of the sample of the decor designation field 320, a decoration parameter determination rule that corresponds to 6 visual samples which do not include information about the thickness of the rimming may be set for every painting pattern.

Thereby, it is possible to deal with the case even when the designation is not made in a portion of another item 71. As defined above, since the decor is partial information about the decoration or abstract information, "a portion of designation does not exist" may not be a special case, and it is possible to deal with the case.

Meanwhile, like the decor designation field 320 illustrated in FIG. 3, in the case in which a sample is selected from among a plurality of samples for the decor, even though a plurality of choices are selected, a decoration parameter suitable for the painting pattern may be determined without determining it is an error.

In this case, the priority order of the choices of the decor may be determined for every painting pattern, and the choice having the highest priority may be selected from the plurality of selected choices. Then, the decoration parameter may be determined as usual.

Like the designation field 1100 illustrated in FIG. 11, in a designation field that independently designates existence or non-existence of each decoration, even when a plurality of modifications are selected and combinations that cannot be simultaneously applied, a decoration parameter suitable for the painting pattern may be determined without determining that t is an error.

For this method, information of an exclusive relationship for each decoration and the priority order of each decoration for every painting pattern are included, and a selection may be made in the order of having the high priority within the range in which they can be simultaneously applied thereto.

When a decoration parameter is previously set for every combination of the decor and the painting pattern and information included in the decor has a continuous value, the determination rule that determines the decoration parameter may be included for every painting pattern. In this case, like the thickness 72 and 73 of the rimming illustrated in FIGS. 7A to 7C, it is possible to deal with the case where the user designates the value from the continuous values.

Figure 9A:
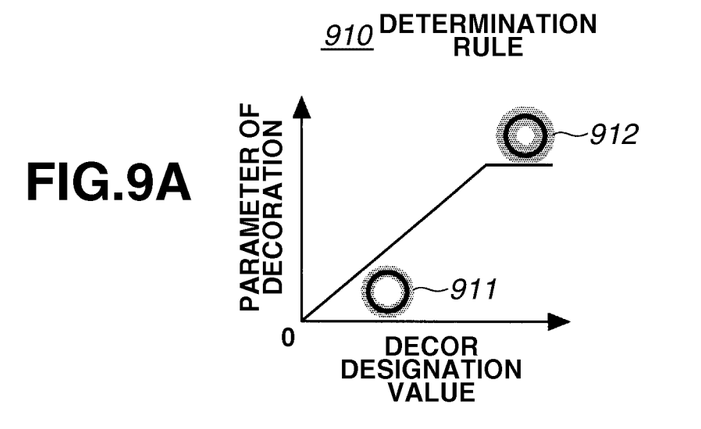
FIGS. 9A, 9B, and 9C each illustrate an example of a determination rule of a rimming thickness.
Figure 9B:
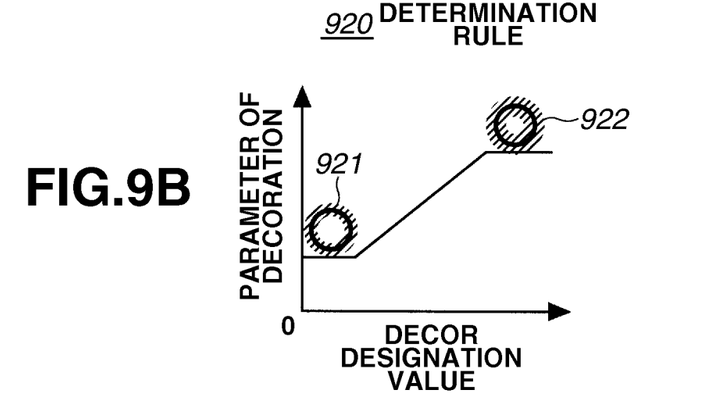
Figure 9C:
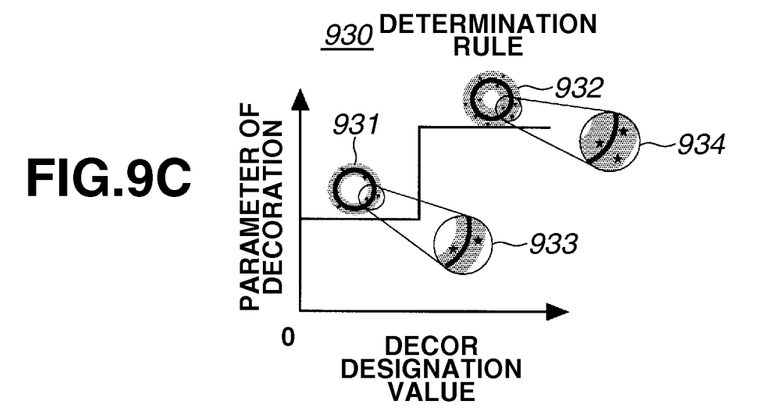

FIGS. 9A, 9B, and 9C each illustrate an example of a rule that determines the thickness of rimming.

When the thickness of the rimming is exemplified, in the example illustrated in FIGS. 9A, 9B, and 9C, relationship between the thickness designated by a user and the determined thickness is represented in a form of a simple function.

The three graphs illustrated in FIGS. 9A, 9B, and 9C are graphs illustrating rules that determine the thickness of rimming having different painting patterns. The horizontal axis indicates a designation value of the thickness of rimming in a decor and is expressed in the unit of "millimeter".

In this case, the "thickness" in another item 71 of FIGS. 7A to 7C is 0.8 mm, and the maximum value of the gauge of the thickness 72 of the rimming is 2.0 mm. As such, a correspondence relationship is previously determined. Thus, a value of the thickness before a conversion to the thickness of the rimming of the decoration parameter may be obtained.

The vertical axis of the graph indicates the thickness of the rimming as the decoration parameter. If the user designates the decor that includes information about the thickness of the rimming, the thickness of the rimming is determined in accordance with the painting pattern to be used.

The determination rule 910 determines the thickness of the rimming in the rimming of the plain color. The circular figures 911 and 912 in the graph visually show how the rimming is performed, when a black circle is given as a handwriting image.

In the case of the plain color, like the figure 911, even though the rimming is thin, it looks enough good. Therefore, a designation value of the decor is basically reflected, and only the upper limit of the thickness is determined.

The determination rule 920 is a rule that determines the thickness of the rimming for oblique stripes. If the minimum thickness is not set, the good-looking is not obtained. Therefore, the lower limit as well as the upper limit is set.

The determination rule 930 determines the thickness of the rimming for a pattern including a star mark. The figure 933 is an enlarged view of a part of the figure 931, and the figure 934 is an enlarged view of a part of the figure 932.

In the case of these figures, since the good-looking is obtained when the rimming is performed to have the width with the integral multiple of the periodic width so that the star mark is not cut in the middle, the thickness is determined to have a discrete value. The figure that has the mark of the first period is the figure 931, and the figure that has the marks of the first and second periods is the figure 932.

In this example, each painting pattern has a rule that determines the thickness of the rimming of the decoration parameter from only the thickness of the rimming in the decor. However, like the choices 810 and 820 of the samples illustrated in FIGS. 8A and 8B, the thickness of the rimming of the decoration parameter may be determined by simultaneously using a plurality of information included in the decor.

Further, the present invention is not limited to the thickness of the rimming. With respect to the information about the width of the rimming that has a decoration parameter having continuous values, such as the area or magnification ratio in the decoration 1016 illustrated in FIG. 10, the same determination rule may be used.

Further, the determination rule of the decoration parameter for each painting pattern may not be necessarily set in advance. If the determination rule of the decoration parameter for the unknown painting pattern is determined, the decoration parameter may be determined according to the determination rule.

Similar to the above case, even when the user creates a new painting pattern using a PC, the image forming apparatus 200, or the handwriting sheet to register the new painting pattern, the predetermined determination rule may be used. As described above, in addition to the painting pattern that is mounted at the time of a shipment, the present invention may be used for the handwriting combine.

Further, when the new painting pattern is registered, a method in which the user sets the determination rule of the decoration parameter for each painting pattern may be used.

For example, according to the determination rule like the choice 810 of the sample illustrated in FIGS. 8A and 8B, the user may newly define the numeral values in the table for the painting pattern to be registered. Further, if the determination rule illustrated in FIGS. 9A, 9B, and 9C is registered, it is possible to use the designation method like other items 71 and 72 illustrated in FIGS. 7A to 7C.

As another method, the repetitive width of the painting pattern may be calculated using the image analysis, and the width corresponding to the integral multiple of the calculated width may be set as the good-looking rimming. Thus, the similar determination rule to the determination rule 930 in which the width nearest to the width designated by the user in the decor is applied may be generated.

In the exemplary embodiments described above, one painting pattern can be selected. However, when the decoration becomes complicated and two kinds or more of painting patterns can be selected, it is similar to the case described above. More specifically, instead of setting the decoration parameter determination rule for the decor for "each pattern", the decoration parameter determination rule may be changed to "each combination of painting patterns".

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2008-201611 filed Aug. 5, 2008, which is hereby incorporated by reference herein in its entirety.

What is claimed is:

1. An image processing apparatus, comprising:
an acquiring unit configured to acquire an image to be decorated;
an input unit configured to input an instruction to designate a pattern of a decor for decoration to the image acquired by the acquiring unit;
a determining unit configured to determine a width of the decor, according to the pattern of decor designated by the instruction input by the input unit; and
a decoration unit configured to decorate the image acquired by the acquiring unit by using the pattern designated by the instruction with the width determined by the determining unit.

2. The image processing apparatus according to claim 1, wherein the decoration unit decorates the image acquired by the acquiring unit by rimming the image, and the determining unit determines thickness of the rimming as the width of the decor.

3. The image processing apparatus according to claim 1, wherein the determining unit determines the width of the decor according to whether the pattern is a plain color or not.

4. The image processing apparatus according to claim 1, further comprising:
a print control unit configured to cause a printing apparatus to print a sheet for adding information by a user; and
an extraction unit configured to acquire a read image obtained by reading the sheet which includes the information added by the user and is printed by the print control unit by a reading apparatus, and to extract the information from the acquired read image;
wherein the decoration unit decorates an image corresponding to the information extracted by the extracting unit.

5. The image processing apparatus according to claim 4, wherein the inputting unit inputs the instruction by the user for designating the pattern of the decor, based on information which is added by the user on the sheet printed by the print control unit and is included in the read image.

6. The image processing apparatus according to claim 1, wherein the inputting unit further inputs an instruction for designating the width of the decor, and in a case where the instruction is input by the inputting unit, the determining unit determines the width designated by the instruction.

7. The image processing apparatus according to claim 6, wherein, in a case where the instruction for designating the width is not input by the input unit, the determining unit determines the width according to the pattern designated by the instruction.

8. A control method for controlling an image processing apparatus, the control method comprising:
acquiring an image to be decorated;
inputting an instruction to designate a pattern of a decor for decoration of the image
determining a width of the decor, according to the designated pattern of decor; and
decorating the image by using the designated pattern with the decor of the determined width.

9. The control method according to claim 8, further comprising:
causing a printing apparatus to print a sheet for adding information by a user; and
acquiring a read image from the printed sheet which includes the information added by the user, to extracting the information added by the user from the read image;
decorating an image corresponding to the extracted information.

10. The control method according to claim 9,
inputting the instruction by the user for designating the pattern of the decor, based on the information added by the user to the sheet.

11. The control method according to claim 8, wherein
in a first case in which an instruction for designating the width of the decor is input, determining the width designated by the instruction.

12. The control method according to claim 11, wherein
in a second case in which the instruction for designating the width is not input, determining the width according to the designated pattern.

13. The control method according to claim 8, further comprising
decorating the image acquired by the acquiring unit by rimming the image, and determining thickness of the rimming as the width of the decor.

14. The control method according to claim 8, further comprising
determining the width of the decor according to whether the pattern is a plain color or not.

15. A non-transitory computer readable medium encoded with instructions for:
acquiring an image to be decorated;
inputting an instruction to designate a pattern of a decor for decoration of the image
determining a width of the decor, according to the designated pattern of decor; and
decorating the image by using the designated pattern with the decor of the determined width.

* * * * *